(12) United States Patent
Lin et al.

(10) Patent No.: US 12,504,731 B2
(45) Date of Patent: Dec. 23, 2025

(54) SCHEDULING METHOD FOR CHARGING MULTIPLE ELECTRIC VEHICLES

(71) Applicant: MOBILETRON ELECTRONICS CO., LTD., Taichung (TW)

(72) Inventors: Sheng-Hsiung Lin, Kaohsiung (TW); Pei-Chen Liu, Taichung (TW); Jie-Yu Lin, Taichung (TW); Wei-Ru Chen, Taichung (TW)

(73) Assignee: MOBILETRON ELECTRONICS CO., LTD., Taichung (TW)

( * ) Notice: Subject to any disclaimer, the term of this patent is extended or adjusted under 35 U.S.C. 154(b) by 385 days.

(21) Appl. No.: 18/121,958

(22) Filed: Mar. 15, 2023

(65) Prior Publication Data
US 2023/0350368 A1 Nov. 2, 2023

(30) Foreign Application Priority Data
Mar. 29, 2022 (TW) .................................. 111111925

(51) Int. Cl.
*G05B 19/042* (2006.01)
(52) U.S. Cl.
CPC .... *G05B 19/042* (2013.01); *G05B 2219/2639* (2013.01)
(58) Field of Classification Search
CPC .......... G05B 19/042; G05B 2219/2639; B60L 2260/44; B60L 53/67; B60L 53/63; Y02T 10/70; Y02T 10/7072; Y02T 90/12
See application file for complete search history.

(56) References Cited

U.S. PATENT DOCUMENTS

| 2013/0069592 A1* | 3/2013 | Bouman | B60L 53/56 320/109 |
| 2013/0179061 A1* | 7/2013 | Gadh | B60L 53/305 701/1 |

(Continued)

FOREIGN PATENT DOCUMENTS

| CN | 110854946 A | 2/2020 |
| CN | 111319510 A | 6/2020 |

(Continued)

OTHER PUBLICATIONS

Search Report for TW111111925, Issued on Apr. 8, 2023, Total of 1 page.

(Continued)

*Primary Examiner* — Kidest Worku
(74) *Attorney, Agent, or Firm* — Apex Juris, pllc; Hilde M. L. Coeckx (57) ABSTRACT

A scheduling method for charging multiple electric vehicles includes: get a sorted list of an operation period; get an estimated charging power consumption required for charging each electric vehicle when each electric vehicle is connected to one of the charging machines and get an instant power consumption of an electricity consuming field; control one or more of the charging machines to correspondingly charge one or more of the plurality of electric vehicles with higher priority in a departure order based on the departure order information in the sorted list when a sum of the instant power consumption and the estimated charging power consumptions is greater than a regulated power consumption that is smaller than an upper limit power consumption of the electricity consuming field, thereby preventing the instant power consumption of the electricity consuming field from exceeding the upper limit power consumption.

13 Claims, 4 Drawing Sheets

(56) References Cited

U.S. PATENT DOCUMENTS

| | | | | |
|---|---|---|---|---|
| 2014/0125279 A1* | 5/2014 | Juhasz | ............... | H02J 7/00 |
| | | | | 320/109 |
| 2020/0269717 A1* | 8/2020 | Gaertner | ............ | B60L 53/68 |
| 2021/0086647 A1* | 3/2021 | Kiessling | ............ | B60L 53/67 |

FOREIGN PATENT DOCUMENTS

| | | | |
|---|---|---|---|
| CN | 113306433 A | | 8/2021 |
| KR | 2012-0113084 A | * | 10/2012 |
| KR | 20210132796 A | * | 11/2021 |
| TW | 201321230 A | | 6/2013 |
| TW | I443505 B | | 7/2014 |
| TW | 201615454 A | * | 5/2016 |

OTHER PUBLICATIONS

English Abstract for TW201615454A, Total of 1 page.
English Abstract for TW201321230A, Total of 1 page.
English Abstract for TWI443505B, Total of 1 page.
English Abstract for CN113306433A, Total of 1 page.
English Abstract for CN111319510A, Total of 1 page.
English Abstract for CN110854946A, Total of 1 page.

* cited by examiner

SCHEDULING METHOD FOR CHARGING MULTIPLE ELECTRIC VEHICLES

BACKGROUND OF THE INVENTION

Technical Field

The present invention relates generally to a charging of electric vehicles, and more particularly to a scheduling method for charging multiple electric vehicles.

Description of Related Art

Conventional vehicles use fuel engines as power sources. During operation, fuel engines exhaust a large amount of exhaust gas, causing air pollution. To be able to carry heavy loads, the engines used for operation vehicles are usually diesel engines, and the volume of exhaust gas of the operation vehicles is large, which causes considerable exhaust gas discharged into the air.

Electric vehicles have been developed to replace conventional vehicles for solving the problem of exhausting gas. Taking electric buses as an example, when a conventional electric bus returns to a station at the end of the day, the driver will connect a charger (e.g. a charging station) to the conventional electric bus for charging before leaving get off work for an operation period of the next day.

Typically, a unit to which the station belongs has signed a contract with a power company for billing the power consumption of the station, thereby it can be billed at a lower electricity rate when the power consumption of the station is within a contract capacity stipulated in the contract, while an additional electricity fee will be charged when the power consumption of the station exceeds the contracted capacity.

When multiple electric buses are charging at the same time, the power consumption of the station may exceed the contracted capacity, and more electricity bills need to be paid.

BRIEF SUMMARY OF THE INVENTION

In view of the above, the primary objective of the present invention is to provide a scheduling method for charging multiple electric vehicles, which could prevent an electricity consumption of an electricity consuming field from exceeding an upper limit power consumption.

The present invention provides a scheduling method for charging a plurality of electric vehicles, applied to a charging system, wherein the charging system comprises a plurality of charging machines located in an electricity consuming field; the scheduling method including following steps:

A. get a sorted list of an operation period, wherein the sorted list includes a departure order information of the plurality of electric vehicles;

B. get an estimated charging power consumption required for charging each of the electric vehicles when each of the electric vehicles is connected to one of the charging machines, and get an instant power consumption of the electricity consuming field;

C. control one or more of the charging machines to correspondingly charge one or more of the electric vehicles with higher priority in a departure order based on the departure order information in the sorted list when a sum of the instant power consumption and the estimated charging power consumption of the electric vehicles with higher priority in the departure order is greater than a regulated power consumption, and control one or more of the charging machines to correspondingly stop charging one or more of the electric vehicles with lower priority in the departure order, wherein the sum of the instant power consumption and the estimated charging power consumption of the electric vehicles with higher priority in the departure order is smaller than or equal to the regulated power consumption, and the regulated power consumption is smaller than an upper limit power consumption of the electricity consuming field.

The present invention further provides a scheduling method for charging multiple electric vehicles, applied to a charging system, wherein the charging system includes a plurality of charging machines located in an electricity consuming field; the scheduling method including following steps:

A. get a sorted list of an operation period, wherein the sorted list includes a departure order information of the electric vehicles during the operation period;

B. get an estimated charging power consumption required for charging one of the electric vehicles when one of the electric vehicles is connected to one of the charging machines, and get an instant power consumption of the electricity consuming field;

C. control corresponding one of the charging machines to charge one of the electric vehicles connected when a sum of the instant power consumption and the estimated charging power consumption obtained in step B is smaller than a regulated power consumption, wherein the regulated power consumption is smaller than an upper limit power consumption of the electricity consuming field;

D. get at least another one estimated charging power consumption required for charging at least another one of the electric vehicles when the at least another one of the electric vehicles is connected to at least another one of the charging machines, and get the instant power consumption of the electricity consuming field;

E. when the sum of the instant power consumption obtained in step D and the at least another estimated charging power consumption obtained in step D is greater than the regulated power consumption, control one of the charging machines to charge one of the electric vehicles with higher priority in a departure order, and control one of the charging machines to stop charging one of the electric vehicles with lower priority in the departure order based on the departure order information in the sorted list.

With the aforementioned design, it could dynamically adjust whether the charger is enabled for charging according to the instant power consumption of the electricity consuming field and the departure order of the electric vehicles, preventing the instant power consumption of the electricity consuming field from exceeding the upper limit power consumption of the electricity consuming field.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
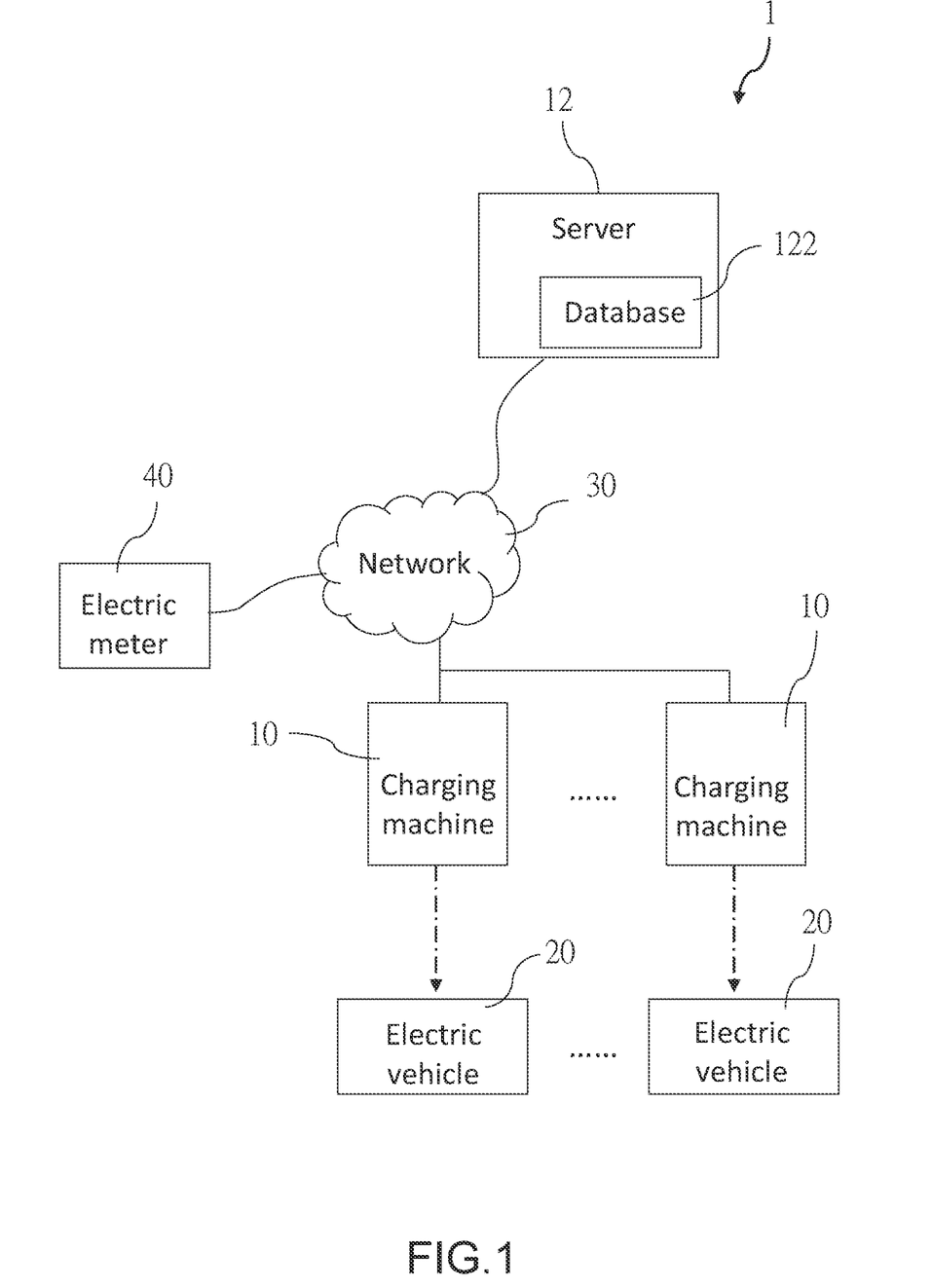
FIG. 1 is a schematic view of the charging system according to a first embodiment of the present invention.

A charging system 1 applying a scheduling method for charging multiple electric vehicles according to a first embodiment of the present invention is illustrated in FIG. 1, wherein the charging system 1 includes a plurality of charging machines 10 disposed in an electricity consuming field and a server 12. The electricity consuming field could be parked for one or more electric vehicles 20, and each of the electric vehicles 20 could be charged with one of the charging machines 10. In the current embodiment, the electric vehicles 20 are respectively an operation electric bus as an example, and the electricity consuming field is a station of electric bus as an example.

The server 12 is signally connected to the charging machines 10. In the current embodiment, the server 12 communicates with the charging machines 10 in a wired way through a network 30 for example. In practice, the server 12 could communicate with the charging machines 10 through CAN-bus or in a wireless way through Wi-Fi. The server 12 has a database 122 for storing data in the database 122, wherein the data stored in the database 122 include a sorted list of the next operation period of the electric vehicles 20, and the sorted list includes a departure order information of the electric vehicles 20. Take table 1 as an example, the operation period could be, for example, the next day, and the sorted list is obtained based on a timetable for the next day. However, this is not a limitation of the present invention, in other embodiments, the sorted list could be sorted by predicting the amount of a predicted power consumption of the electric vehicles 20 in the operation period, or could be determined by the personnel to charge.

In the current embodiment, the sorted list includes a plurality of fields including a departure order information field, a vehicle number field, a vehicle identification number field, and a charging station identification number field, wherein a departure order information is a departure time as an example; a vehicle identification number is a vehicle identification number (VIN) of a vehicle as an example. In practice, the departure order information could be a serial number of a departure order; the vehicle identification number could be set by a manager of electric vehicle. A charging station identification number in the charging station identification number field is obtained when each of the electric vehicles 20 is connected to one of the charging machines 10.

TABLE 1

| Sorted list | | | |
|---|---|---|---|
| Departure order information (Departure time) | Vehicle number | Vehicle identification number | Charging station identification number |
| 05:00 | EAB-128 | RK0B0000000000108 | 002 |
| 05:20 | EAB-123 | RK0B0000000000035 | 004 |

TABLE 1-continued

| Sorted list | | | |
|---|---|---|---|
| Departure order information (Departure time) | Vehicle number | Vehicle identification number | Charging station identification number |
| 06:00 | EAB-143 | RK0B0000000000401 | 005 |
| 07:00 | EAA-253 | RK0B0000000000503 | 007 |
| 08:00 | EAA-004 | RK0B0000000000607 | N/A |

Note:
N/A represents that the electric vehicle is not connected to the charging machine At least one electric meter 40 is disposed in the electricity consuming field and is connected to a power grid. The server 12, the charging machines 10, and other electricity consuming devices are connected to the power grid through the electric meter 40 to obtain an electricity from the power grid. The electric meter 40 communicates with the server 12 through the network 30 for example, and the server 12 continuously obtains an instant power consumption of the electricity consuming field from the meter 40 for monitoring.

Figure 2:
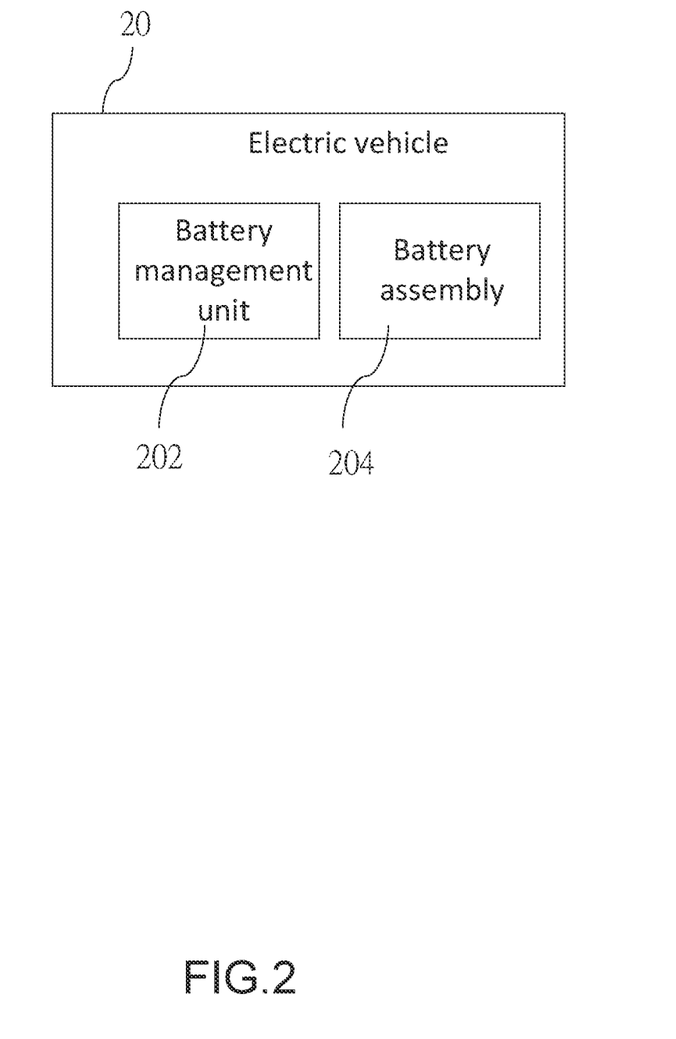
FIG. 2 is a schematic view of the electric vehicle according to the first embodiment of the present invention.

Referring to FIG. 2, each of the electric vehicles 20 includes a battery management unit 202 and a battery assembly 204. The battery management unit 202 is electrically connected to the battery assembly 204 for monitoring battery states of the battery assembly 204, wherein the battery states include a voltage value, a current value, a temperature, a state of charge (SOC), a state of health (SOH), etc. The battery management unit 202 further records a vehicle identification number and a charging information of each of the electric vehicles 20, wherein the charging information includes a charging voltage value and a charging current value required for charging the battery assembly 204; the charging voltage value could be, for example, 590V; the charging current value could be, for example, 80 A. In the current embodiment, the electric vehicles 20 have the same charging voltage value and the same charging current value. However, this is not a limitation of the present invention, the electric vehicles 20 could have different charging voltage values and different charging current values in other embodiments.

Figure 3:
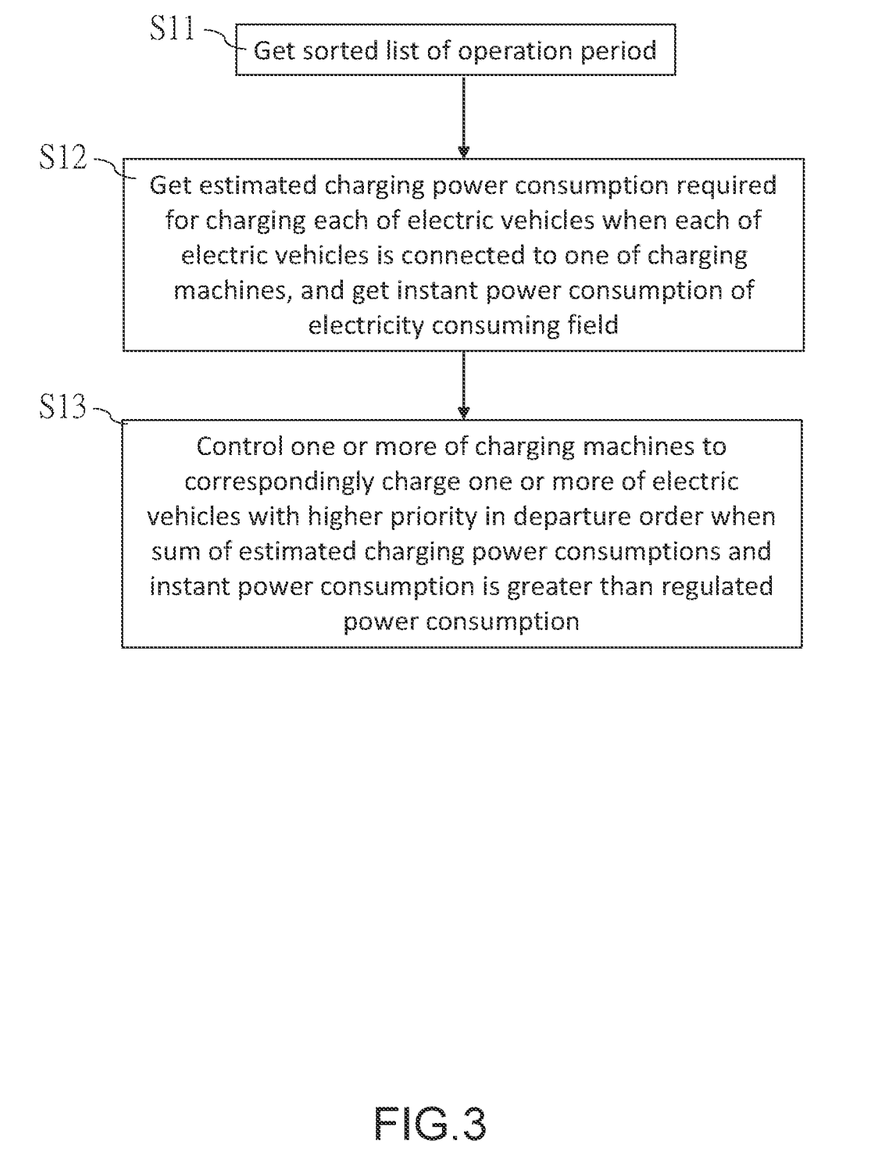
FIG. 3 is a flowchart of the scheduling method for charging multiple electric vehicles according to the first embodiment of the present invention.

The scheduling method for charging multiple electric vehicles of the current embodiment is taken by the charging system 1 and is applicable to various power consumption periods (including an off-peak power consumption period and a peak power consumption period). Preferably, the scheduling method for charging multiple electric vehicles is taken when a time of the electricity consuming field falls within the off-peak power consumption period for saving electricity bills. However, this is not a limitation of the present invention, in other embodiments, the scheduling method for charging multiple electric vehicles could be taken when the time of the electricity consuming field falls within the peak power consumption period. The scheduling method for charging multiple electric vehicles includes following steps as shown in FIG. 3.

Step S11: get a sorted list of an operation period.

In the current embodiment, the server 12 retrieves a sorted list of the next operation period (e.g. the next day) from the database 122.

Step S12: get an estimated charging power consumption of each of the electric vehicles 20 when each of the electric vehicles 20 is connected to one of the charging machines 10, and get an instant power consumption of the electricity consuming field.

In the current embodiment, after each of the electric vehicles 20 returns to the electricity consuming field after the operation period, the personnel connects each of the charging machines 10 to one of the electric vehicles 20. Since the time that the electric vehicles 20 return to the electricity consuming field is different, the time that the electric vehicles 20 being connected to the charging machines 10 is also different. After each of the electric vehicles 20 is connected to one of the charging machines 10, each of the charging machines 10 communicates with the battery management unit 202 of one of the electric vehicles 20 for obtaining the vehicle identification number, the charging information, and the battery states of the corresponding electric vehicle 20. In the current step, the charging machines 10 have not started charging the electric vehicles 20. Each of the charging machines 10 transmits the vehicle identification number, the charging information, and the battery states of the corresponding electric vehicle 20 obtained to the server 12, and further transmits the charging station identification number thereof to the server 12, thereby allowing the server 12 to identify the vehicle identification number, the charging information, and the battery states received come from which one of the charging machines 10. After that, the server 12 correspondingly records a charging station identification number in the charging station identification number field in the sorted list, and builds a corresponding relationship between each of the electric vehicles 20 and one of the charging machines 10 connected, thereby allowing subsequent control of the corresponding charging machine 10 to start charging or stop charging according to the charging station identification number.

The server 12 calculates an estimated charging power consumption required for charging each of the electric vehicles 20 based on the charging voltage value and the charging current value of the charging information of the corresponding electric vehicle 20. For instance, the estimated charging power consumption could be the charging voltage value times the charging current value (i.e., 590V× 80 A=47.2 KW, which could be approximated as 47 KW), and the server 12 uses 47 KW as the estimated charging power consumption of each of the electric vehicles 20. Additionally, the estimated charging power consumption could further include an estimated conversion power consumption of each of the charging machines (e.g. 3 KW), thereby the estimated charging power consumption is 50.2 KW, which could be approximated as 50 KW. In practice, each of the vehicle identification numbers and the corresponding estimated charging power consumption data could be built in the database 122, so that when the server 12 receives the vehicle identification number from any one of the charging machines 10, the server 12 could search in the database 122 to obtain the estimated charging power consumption corresponding to the vehicle identification number.

Step S13: a charging step; the server 12 determines whether to allow all of the charging machines 10 connected to the electric vehicles 20 to start charging, or to allow a part of the charging machines 10 connected to the electric vehicles 20 to start charging based on a sum of the estimated charging power consumption obtained and the instant power consumption obtained. More specifically, the server 12 records a contract capacity of each of the power consumption periods of the electricity consuming field. In the current embodiment, the off-peak power consumption period has a contract capacity, and the peak power consumption period also has a contract capacity. The server 12 sets an upper limit power consumption of one of the power consumption periods to which the current time belongs based on the contract capacity of each of the power consumption periods, wherein the upper limit power consumption is smaller than the contract capacity. A difference between the upper limit power consumption and the contract capacity should take into account a normal power consumption of other normal electrical equipment in the electricity consuming field (such as electrical appliances and computer equipment that maintain the normal operation of the electricity consuming field), that is, the upper limit power consumption could be set as the contract capacity minus the normal power consumption of other electrical equipment.

The server 12 generates a regulated power consumption corresponding to each of the power consumption periods based on the upper limit power consumption of the corresponding power consumption period to which the current time of the electricity consuming field belongs, wherein the regulated power consumption is smaller than the upper limit power consumption and is obtained by subtracting a buffer power consumption from the upper limit power consumption; the buffer power consumption is greater than or equal to the estimated charging power consumption of one of the electric vehicles 20. Preferably, the buffer power consumption is greater than the estimated charging power consumption of one of the electric vehicles 20. For instance, if the upper limit power consumption at the off-peak power consumption period is 400 KW and the buffer power consumption is 60 KW, the regulated power consumption is 340 KW. The regulated power consumption is changed along with the upper limit power consumption of the corresponding power consumption period to which the current time belongs. For instance, when the power consumption period to which the current time belongs falls within the peak power consumption period and the upper limit power consumption is 600 KW, the server 12 changes the regulated power consumption to 540 KW (i.e., the regulated power consumption is obtained by 600 KW-60 KW).

The server 12 determines that whether the sum of the estimated charging power consumptions and the instant power consumption is greater than the regulated power consumption or not.

If the server 12 determines that the sum of the estimated charging power consumptions and the instant power consumption is smaller than or equal to the regulated power consumption, which means that a currently available power is sufficient, the server 12 controls all of the charging machines 10 being connected to the electric vehicles 20 to correspondingly charge the connected electric vehicles 20, wherein the server 12 controls the corresponding charging machine 10 to enable charging according to the charging station identification number.

If the server 12 determines that the sum of the estimated charging power consumptions and the instant power consumption is greater than the regulated power consumption, which means that a currently available power is insufficient, the server 12 correspondingly controls one or more of the charging machines 10 to charge one or more of the electric vehicles 20 with higher priority in the departure order based on the departure order information in the sorted list, and correspondingly controls one or more of the charging machines 10 to stop charging one or more of the electric vehicles 20 with lower priority in the departure order, wherein the sum of the instant power consumption and the estimated charging power consumption of one or more of the electric vehicles 20 with higher priority in the departure order is smaller than or equal to the regulated power consumption.

At this time, the instant power consumption measured by the meter 40 includes the power consumption of the charging machines 10 charging the electric vehicles 20. After that, when any one of the charging machines 10 finishes charging the corresponding electric vehicle 20 with higher priority in the departure order, the corresponding charging machine 10 stops charging and sends a completion message to notify the server 12, and the server 12 controls one of the charging machines 10 to charge one of the electric vehicles 20 with lower priority in the departure order based on the departure order information in the sorted list.

In this way, the instant power consumption could be prevented from exceeding the upper limit power consumption when the charging machines 10 charging the electric vehicles 20 connected. Even in a process of charging, since the buffer power consumption has been considered, the instant power consumption of the electricity consuming field could be prevented from exceeding the upper limit power consumption at the current time when other abnormal electrical equipment (such as pumping motors, electric tools for maintenance, etc.) of the electricity consuming field is temporarily started.

Additionally, the scheduling method for charging multiple electric vehicles of the current embodiment further includes following steps.

Step S14: the server 12 continuously obtains the instant power consumption of the electricity consuming field; at this time, the instant power consumption measured by the meter 40 includes the power consumption of the charging machines 10 charging the electric vehicles 20; when the instant power consumption obtained is greater than the regulated power consumption, the server 12 controls the charging machines 10 charging the electric vehicles 20 to charge the electric vehicles 20 connected in a way of reducing output power (i.e., the charging machines 10 charge the electric vehicles 20 with a reduced output power).

For instance, the server 12 sends a load-shedding command to the charging machines 10 connected to the electric vehicles 20 to reduce a charging current that the charging machines 10 outputs to the electric vehicles 20 connected. For instance, an original charging current that the charging machine 10 outputs is 80 A, and a charging current that the charging machine outputs after load-shedding is reduced to three-quarters (i.e., 60 A) or one-half (i.e., 40 A) of the original charging current, allowing an output power after load-shedding is reduced to three-quarters or one-half of an original output power for preventing the instant power consumption from exceeding the upper limit power consumption.

After that, if the instant power consumption obtained is still greater than the regulated power consumption after the output power of the charging machines 10 charging the electric vehicles 20 is reduced, the server 12 controls one or more of the charging machines 10 charging the electric vehicles 20 to stop charging one or more of the electric vehicles 20 with lower priority in the departure order, thereby further reducing the instant power consumption at the current time (i.e., allowing the instant power consumption at the current time being smaller than or equal to the regulated power consumption).

After that, if the instant power consumption obtained is smaller than the regulated power consumption, the server 12 controls at least one of the charging machines 10 charging at least one of the electric vehicles 20 with higher priority in the departure order to resume charging with the original output power in sequence based on the departure order information in the sorted list.

Additionally, after corresponding one or more of the charging machines 10 that have been controlled to stop charging one or more of the electric vehicles 20 with lower priority in the departure order in step S13, step S14 could further include: the server 12 continuously obtains the instant power consumption of the electricity consuming field including the power consumption of the charging machines 10 charging the electric vehicles 20, and controls at least one of the charging machines 10 to resume charging at least one of the electric vehicles 20 with lower priority in the departure order when the sum of the instant power consumption obtained and the estimated charging power consumption of one or more of the electric vehicles 20 with lower priority in the departure order is smaller than the regulated power consumption. In this way, at least one of the electric vehicles 20 with lower priority in the departure order could be charged when the currently available power is sufficient.

In the first embodiment, take a case where multiple of the electric vehicles 20 are respectively connected to multiple of the charging machines 10 at the same time as an example for illustration. A scheduling method for charging multiple electric vehicles according to a second embodiment describes a situation that the electric vehicles 20 are connected to the charging machines 10 in sequence.

Figure 4:
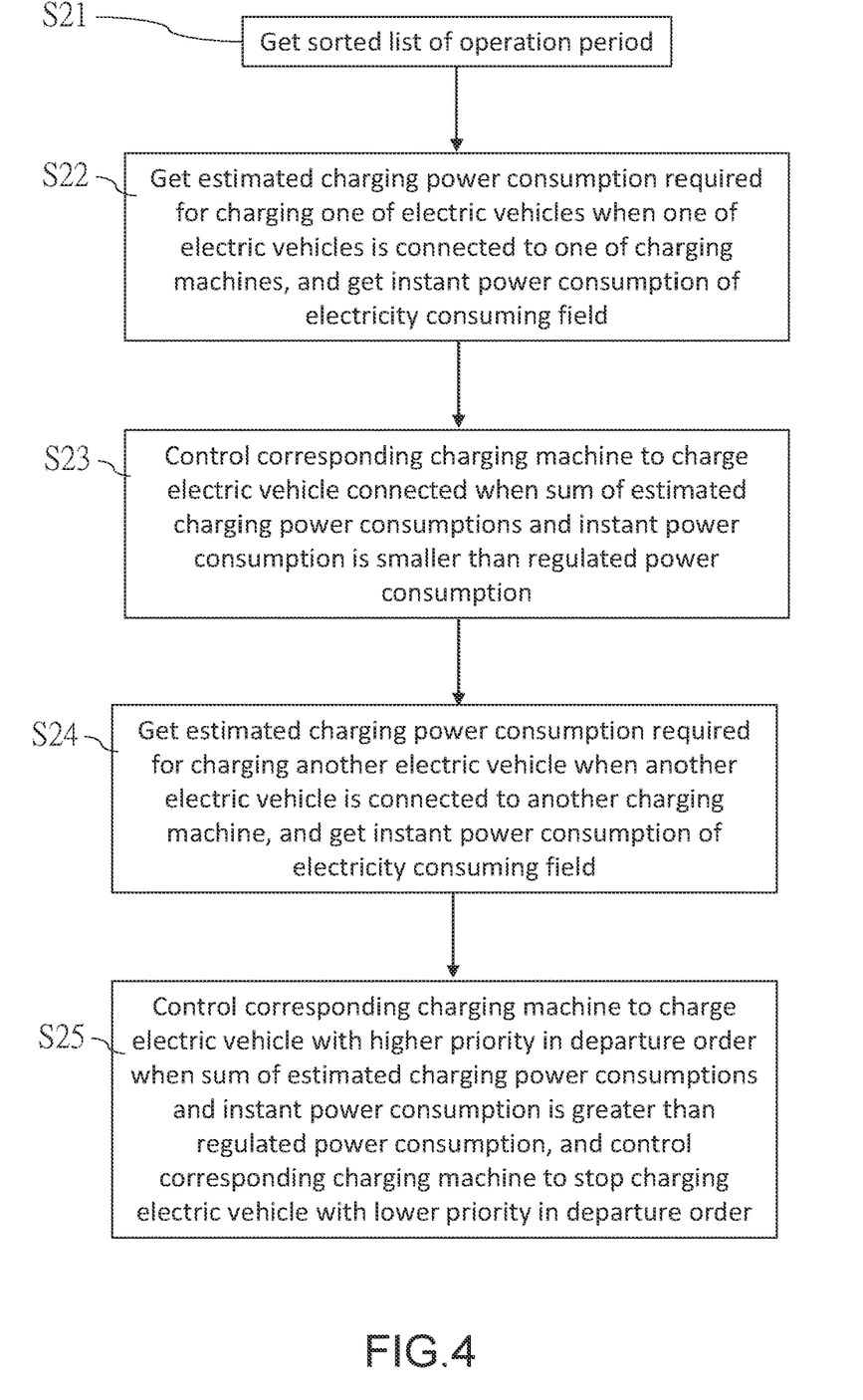
FIG. 4 is a flowchart of the scheduling method for charging multiple electric vehicles according to a second embodiment of the present invention.

The scheduling method for charging multiple electric vehicles according to the second embodiment is illustrated in FIG. 4, is also applied to the charging system 1 of the first embodiment, and has almost the same steps as that of the first embodiment.

Step S21: the server 12 gets the sorted list of the operation period.

Step S22: when one of the electric vehicles 20 is connected to one of the charging machines 10, get the estimated charging power consumption required for charging the corresponding electric vehicle 20, and get the instant power consumption of the electricity consuming field.

In step S22, corresponding one of the electric vehicles 20 could be, for example, the first one of the electric vehicles 20 being connected to one of the charging machines 10. Alternatively, corresponding one of the electric vehicles 20 could be, for example, at least one of the electric vehicles 20 having been connected to at least one of the charging machines 10 for being charging before step S22.

The way that the server 12 obtaining the estimated charging power consumption and the instant power consumption is the same as that of the first embodiment.

Step S23: if a sum of the estimated charging power consumption and the instant power consumption obtained in step S22 is smaller than or equal to the regulated power consumption, the server 12 correspondingly controls at least one of the charging machines 10 to charge at least one of the electric vehicles 20 connected.

If the sum of the estimated charging power consumption and the instant power consumption obtained in step S22 is greater than the regulated power consumption, the server 12 controls at least one of the charging machines 10 temporarily not charging (i.e., to temporarily stop charging), thereby preventing the instant power consumption from exceeding the upper limit power consumption. Until the sum of the estimated charging power consumption and the instant power consumption at the current time is smaller than or equal to the regulated power consumption, the server 12 controls at least one of the charging machines 10 that temporarily not charging to resume charging.

Step S24: get the estimated charging power consumption required for charging at least another one of the electric vehicles 20 when the at least another one of the electric vehicles 20 is connected to at least another one of the charging machines 10, and get the instant power consumption of the electricity consuming field at the current time, wherein the instant power consumption obtained in step S24 includes the power consumption of at least one of the charging machines 10 charging the electric vehicles 20.

Step S25: the server 12 determines that whether the sum of the instant power consumption and the estimated charging power consumption obtained in step S24 is greater than the regulated power consumption or not.

If the server 12 determines that the sum of the instant power consumption and the estimated charging power consumption obtained in step S24 is smaller than or equal to the regulated power consumption, which means that a currently available power is sufficient, the server 12 correspondingly controls at least one of the charging machines 10 to charge the electric vehicles 20 connected in step S24, thereby allowing multiple of the electric vehicles 20 to be charged.

If the server 12 determines that the sum of the instant power consumption and the estimated charging power consumption obtained in step S24 is greater than the regulated power consumption, which means that a currently available power is insufficient, the server 12 correspondingly controls one of the charging machines 10 to charge one of the electric vehicles 20 with higher priority in the departure order and correspondingly controls one of the charging machines 10 to stop charging one of the electric vehicles 20 with lower priority in the departure order based on the departure order information in the sorted list.

For instance, if the electric vehicle 20 currently being charged has a lower priority in the departure order than the electric vehicle 20 connected in step S24, the electric vehicle 20 connected in step S24 is allowed to be charged, and the charging of the electric vehicle 20 currently being charged is stopped; on the contrary, if the electric vehicle 20 currently being charged has a higher priority in the departure order than the electric vehicle 20 connected in step S24, the server 12 temporarily not control the corresponding charging machine 10 to charge the electric vehicle 20 connected in step S24.

In this way, the electric vehicle 20 with higher priority in the departure order could be charged after being connected to one of the charging machines 10 when the currently available power is insufficient.

After that, when any one of the charging machines 10 finishes charging the corresponding electric vehicle 20 with higher priority in the departure order, the corresponding charging machine 10 stops charging and sends a completion message to notify the server 12, and the server 12 correspondingly controls one of the charging machines 10 to charge one of the electric vehicles 20 with lower priority in the departure order based on the departure order information in the sorted list.

Additionally, the scheduling method for charging multiple electric vehicles of the current embodiment further includes following steps.

Step S26: the server 12 continuously obtains the instant power consumption of the electricity consuming field including the power consumption of the charging machines 10 charging the electric vehicles 20; if the instant power consumption obtained is greater than the regulated power consumption, the server 12 controls the charging machines 10 charging the electric vehicles 20 to charge the electric vehicles 20 connected in a way of reducing output power (i.e., the charging machines 10 charge the electric vehicles 20 with a reduced output power).

After that, if the instant power consumption obtained is smaller than the regulated power consumption, the server 12 controls at least one of the charging machines 10 charging at least one of the electric vehicles 20 to resume charging with the original output power in sequence to the at least one of the electric vehicles 20 with higher priority in the departure order based on the departure order information in the sorted list.

Additionally, after corresponding one or more of the charging machines 10 that have been controlled to stop charging one or more of the electric vehicles 20 with lower priority in the departure order in step S25, step S26 could further include: the server 12 continuously obtains the instant power consumption of the electricity consuming field, and controls one of the charging machines 10 to charge the corresponding electric vehicle 20 with lower priority in the departure order when the sum of the instant power consumption obtained and the estimated charging power consumption of the corresponding electric vehicle 20 with lower priority in the departure order is smaller than the regulated power consumption. In this way, corresponding one of the electric vehicles 20 with lower priority in the departure order could be charged when the currently available power is sufficient.

In summary, the scheduling method for charging multiple electric vehicles of the present invention could dynamically adjust whether to enable the charging machines 10 or not based on the instant power consumption of the electricity consuming field and the departure order information, preventing the instant power consumption of the electricity consuming field from exceeding the upper limit power consumption of the electricity consuming field.

It must be pointed out that the embodiments described above are only some preferred embodiments of the present invention. All equivalent methods which employ the concepts disclosed in this specification and the appended claims should fall within the scope of the present invention.

What is claimed is:

1. A scheduling method for charging a plurality of electric vehicles, applied to a charging system, wherein the charging system comprises a plurality of charging machines located in an electricity consuming field; comprising steps of:
   A. getting a sorted list of an operation period, wherein the sorted list comprises a departure order information of the plurality of electric vehicles;
   B. getting an estimated charging power consumption required for charging each of the plurality of electric vehicles when each of the plurality of electric vehicles is connected to one of the plurality of charging machines, and getting an instant power consumption of the electricity consuming field;
   C. controlling one or more of the plurality of charging machines to correspondingly charge one or more of the plurality of electric vehicles with higher priority in a departure order based on the departure order information in the sorted list when a sum of the instant power consumption and the estimated charging power consumption of the plurality of electric vehicles with higher priority in the departure order is greater than a regulated power consumption, and controlling one or more of the plurality of charging machines to correspondingly stop charging one or more of the plurality of electric vehicles with lower priority in the departure order, wherein the sum of the instant power consumption and the estimated charging power consumption of the plurality of electric vehicles with higher priority in the departure order is smaller than or equal to the regulated power consumption, and the regulated power consumption is smaller than an upper limit power consumption of the electricity consuming field;

wherein after one or more of the plurality of charging machines stops charging one or more of the plurality of electric vehicles with lower priority in the departure order in step C, further comprising step D: continuously obtaining the instant power consumption of the electricity consuming field, and controlling at least one of the plurality of charging machines to resume charging of at least one of the plurality of electric vehicles with lower priority in the departure order when the sum of the instant power consumption obtained in step D and the estimated charging power consumption of at least one of the plurality of electric vehicles with lower priority in the departure order is smaller than the regulated power consumption.

2. The scheduling method as claimed in claim 1, wherein in step C, further comprising a step of controlling one or more of the plurality of charging machines to correspondingly charge one or more of the plurality of electric vehicles connected when the sum of the instant power consumption and the estimated charging power consumption of the plurality of electric vehicles with higher priority in the departure order is smaller than the regulated power consumption.

3. The scheduling method as claimed in claim 1, wherein in step D, further comprising a step of continuously obtaining the instant power consumption of the electricity consuming field, and controlling the plurality of charging machines charging the plurality of electric vehicles to correspondingly charge the connected electric vehicles in a way of reducing output power when the instant power consumption obtained in step D is greater than the regulated power consumption.

4. The scheduling method as claimed in claim 3, wherein in step D, further comprising a step of controlling the plurality of charging machines charging the plurality of electric vehicles to stop charging one or more of the plurality of electric vehicles with lower priority in the departure order when the instant power consumption obtained is still greater than the regulated power consumption after the plurality of charging machines charging the connected electric vehicles in the way of reducing output power.

5. The scheduling method as claimed in claim 3, wherein in step D, further comprising a step of controlling one or more of the plurality of charging machines charging the connected electric vehicles with higher priority in the departure order to resume charging with an original output power when the instant power consumption obtained is smaller than the regulated power consumption.

6. The scheduling method as claimed in claim 1, wherein after one or more of the plurality of charging machines stop charging one or more of the plurality of electric vehicles with lower priority in the departure order in step C, step C further comprising a step of controlling at least one of the plurality of charging machines to resume charging of at least one of the plurality of electric vehicles with lower priority in the departure order based on the departure order information in the sorted list when any one of the plurality of charging machines finishes charging one of the plurality of electric vehicles with higher priority in the departure order.

7. The scheduling method as claimed in claim 1, wherein the regulated power consumption is obtained by subtracting a buffer power consumption from the upper limit power consumption of the electricity consuming field, and the buffer power consumption is greater than the estimated charging power consumption of one of the plurality of electric vehicles.

8. A scheduling method for charging multiple electric vehicles, applied to a charging system, wherein the charging system comprises a plurality of charging machines located in an electricity consuming field; comprising steps of:

A. getting a sorted list of an operation period, wherein the sorted list comprises a departure order information of the plurality of electric vehicles during the operation period;

B. getting an estimated charging power consumption required for charging one of the plurality of electric vehicles when one of the plurality of electric vehicles is connected to one of the plurality of charging machines, and getting an instant power consumption of the electricity consuming field;

C. controlling corresponding one of the plurality of charging machines to charge one of the plurality of electric vehicles connected when a sum of the instant power consumption and the estimated charging power consumption obtained in step B is smaller than a regulated power consumption, wherein the regulated power consumption is smaller than an upper limit power consumption of the electricity consuming field;

D. getting at least another estimated charging power consumption required for charging at least another one of the plurality of electric vehicles when the at least another one of the plurality of electric vehicles is connected to at least another one of the plurality of charging machines, and getting the instant power consumption of the electricity consuming field;

E. when the sum of the instant power consumption obtained in step D and the at least another estimated charging power consumption obtained in step D is greater than the regulated power consumption, controlling one of the plurality of charging machines to charge one of the plurality of electric vehicles with higher priority in a departure order, and controlling one of the plurality of charging machines to stop charging one of the plurality of electric vehicles with lower priority in the departure order based on the departure order information in the sorted list;

wherein after one of the plurality of charging machines stops charging one of the plurality of electric vehicles with lower priority in the departure order in step E, further comprising step F: continuously obtaining the instant power consumption of the electricity consuming field, and controlling one of the plurality of charging machines to resume charging of one of the plurality of electric vehicles with lower priority in the departure order when the sum of the instant power consumption obtained in step F and the estimated charging power consumption of one of the plurality of electric vehicles with lower priority in the departure order is smaller than the regulated power consumption.

9. The scheduling method as claimed in claim 8, wherein in step E, further comprising a step of controlling corresponding one of the plurality of charging machines to resume charging the other one of the plurality of electric vehicles connected when the sum of the instant power consumption obtained in step D and the at least another estimated charging power consumption obtained in step D is smaller than the regulated power consumption.

10. The scheduling method as claimed in claim 8, wherein in step F, further comprising a step of continuously obtaining the instant power consumption of the electricity consuming field, and controlling the plurality of charging machines charging the plurality of electric vehicles to correspondingly charge the connected electric vehicles in a way of reducing output power when the instant power consumption obtained in step F is greater than the regulated power consumption regulated power consumption.

11. The scheduling method as claimed in claim 10, wherein in step F, further comprising a step of controlling the plurality of charging machines charging the plurality of electric vehicles to resume charging the plurality of electric vehicles connected with an original output power when the instant power consumption obtained is smaller than the regulated power consumption.

12. The scheduling method as claimed in claim 8, wherein after one of the plurality of charging machines stop charging one or more of the plurality of electric vehicles with lower priority in the departure order in step E, step E further comprising a step of controlling one of the plurality of charging machines to resume charging of one of the plurality of electric vehicles with lower priority in the departure order based on the departure order information in the sorted list when any one of the plurality of charging machines finishes charging one of the plurality of electric vehicles with higher priority in the departure order.

13. The scheduling method as claimed in claim 8, wherein the regulated power consumption is obtained by subtracting a buffer power consumption from the upper limit power consumption of the electricity consuming field, and the buffer power consumption is greater than the estimated charging power consumption of one of the plurality of electric vehicles.

\* \* \* \* \*